US012786016B2

(12) United States Patent

Åhlander et al.

(10) Patent No.: US 12,786,016 B2
(45) Date of Patent: Nov. 3, 2026

(54) ROBUST PORT SELECTION

(71) Applicant: Telefonaktiebolaget LM Ericsson (publ), Stockholm (SE)

(72) Inventors: Mats Åhlander, Solna (SE); Sebastian Faxér, Stockholm (SE); Krister Edström, Hjärup (SE); Xueying Hou, Lund (SE); Stéphane Tessier, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 361 days.

(21) Appl. No.: 18/576,200

(22) PCT Filed: Jul. 7, 2022

(86) PCT No.: PCT/SE2022/050699

§ 371 (c)(1),
(2) Date: Jan. 3, 2024

(87) PCT Pub. No.: WO2023/282840

PCT Pub. Date: Jan. 12, 2023

(65) Prior Publication Data

US 2024/0372754 A1 Nov. 7, 2024

Related U.S. Application Data

(60) Provisional application No. 63/220,207, filed on Jul. 9, 2021.

(51) Int. Cl.

| | |
|---|---|
| ***H04L 25/02*** | (2006.01) |
| ***H04B 7/06*** | (2006.01) |

(52) U.S. Cl.

CPC ....... *H04L 25/0242* (2013.01); *H04B 7/0617* (2013.01); *H04L 25/0224* (2013.01)

(58) Field of Classification Search

CPC ............ H04L 25/0224; H04L 25/0242; H04B 7/0417; H04B 7/0434; H04B 7/0617; G06F 17/16

See application file for complete search history.

(56) References Cited

U.S. PATENT DOCUMENTS 10,389,414 B1 8/2019 Qi et al.
11,792,782 B1 * 10/2023 Shattil .................. H04B 7/0452 370/329

(Continued)

FOREIGN PATENT DOCUMENTS

CN 107547117 A 1/2018
CN 109309517 A 2/2019

(Continued)

OTHER PUBLICATIONS

Supplementary European Search Report for European Patent Application No. 22838134.9, mailed Oct. 18, 2024, 4 pages.

(Continued)

*Primary Examiner* — Congvan Tran

(74) *Attorney, Agent, or Firm* — Withrow & Terranova, PLLC

(57) ABSTRACT

Systems and methods for port selection in a wireless communication system are disclosed. In embodiment, a method performed by a radio access network (RAN) node for mapping Sounding Reference Signal (SRS) ports to transmission layers comprises obtaining a channel matrix, H, for one subcarrier or a group of subcarriers for a particular User Equipment (UE) and transforming the channel matrix, H, using a Singular Value Decomposition (SVD) of the channel matrix to thereby provide a transformed channel matrix. The method further comprises computing beamforming weights using the transformed channel matrix. Embodiments of a RAN node are also disclosed.

16 Claims, 4 Drawing Sheets

(56) References Cited

U.S. PATENT DOCUMENTS

| | | | | |
|---|---|---|---|---|
| 12,316,577 | B2 | 5/2025 | Liu et al. | |
| 2003/0060173 | A1* | 3/2003 | Lee | H04L 1/06 455/272 |
| 2004/0209579 | A1* | 10/2004 | Vaidyanathan | H04B 7/0413 455/101 |
| 2006/0071807 | A1 | 4/2006 | Sadowsky | |
| 2006/0120478 | A1 | 6/2006 | Kim et al. | |
| 2009/0103641 | A1 | 4/2009 | Masui et al. | |
| 2012/0002759 | A1 | 1/2012 | Lin et al. | |
| 2013/0215989 | A1 | 8/2013 | Miyatani et al. | |
| 2018/0167183 | A1 | 6/2018 | Zhang et al. | |
| 2019/0174527 | A1 | 6/2019 | Park et al. | |
| 2019/0260613 | A1 | 8/2019 | Lee et al. | |
| 2020/0229201 | A1 | 7/2020 | Tong et al. | |
| 2021/0143874 | A1 | 5/2021 | Park et al. | |
| 2022/0209839 | A1 | 6/2022 | Cheng et al. | |
| 2022/0377758 | A1* | 11/2022 | Nurmela | H04W 72/542 |
| 2023/0058307 | A1* | 2/2023 | MolavianJazi | H04B 7/0848 |
| 2023/0268970 | A1* | 8/2023 | Wernersson | H04B 7/0634 375/267 |
| 2024/0056137 | A1* | 2/2024 | Wang | H04B 7/0456 |
| 2024/0056159 | A1* | 2/2024 | Hewavithana | H04B 7/0452 |
| 2024/0195472 | A1* | 6/2024 | Lu | H04B 7/022 |
| 2024/0244455 | A1* | 7/2024 | Chen | H04W 24/02 |
| 2024/0313832 | A1* | 9/2024 | Hou | H04L 25/021 |

FOREIGN PATENT DOCUMENTS

| | | | |
|---|---|---|---|
| CN | 111758272 | A | 10/2020 |
| EP | 1657829 | A1 | 5/2006 |
| EP | 4087151 | A1 | 11/2022 |
| WO | 2017008307 | A1 | 1/2017 |
| WO | 2017219739 | A1 | 12/2017 |
| WO | 2018050088 | A1 | 3/2018 |
| WO | 2020154832 | A1 | 8/2020 |
| WO | 2020200471 | A1 | 10/2020 |
| WO | 2021135837 | A1 | 7/2021 |
| WO | 2023282839 | A1 | 1/2023 |

OTHER PUBLICATIONS

Supplementary European Search Report for European Patent Application No. 22838133.1, mailed Oct. 16, 2024, 5 pages.

Author Unknown, "Technical Specification Group Radio Access Network; NR; Physical layer procedures for data (Release 16)," Technical Specification 38.214, Version 16.6.0, Jun. 2021, 3GPP Organizational Partners, 172 pages.

Bhavatharini, et al., "Offloading Mobile Computations To Cloud To Save Mobile Energy," International Journal of Engineering Research and Technology, Jul. 30, 2018, pp. 26-30.

International Search Report and Written Opinion for International Patent Application No. PCT/SE2022/050699, mailed Sep. 16, 2022, 15 pages.

International Search Report and Written Opinion for International Patent Application No. PCT/SE2022/050698, mailed Sep. 27, 2022, 14 pages.

Examination Report for European Patent Application No. 22838134.9, mailed Oct. 30, 2024, 7 pages.

Examination Report for European Patent Application No. 22838133.1, mailed Oct. 28, 2024, 7 pages.

* cited by examiner

ROBUST PORT SELECTION

RELATED APPLICATIONS

This application is a 35 U.S.C. § 371 national phase filing of International Application No. PCT/SE2022/050699, filed Jul. 7, 2022, which claims the benefit of provisional patent application Ser. No. 63/220,207, filed Jul. 9, 2021, the disclosures of which are hereby incorporated herein by reference in their entireties.

TECHNICAL FIELD

The present disclosure relates to a wireless communication system and, more specifically, to port selection for a Multiple-Input Multiple-Output (MIMO) transmission in a wireless communication system.

BACKGROUND

In Fourth Generation (4G) and Fifth Generation (5G) Third Generation Partnership Project (3GPP) networks, the introduction of Advanced Antenna Systems (AASs) on the base stations has allowed for the possibility to do beamforming and spatial multiplexing schemes with many more transmission layers than was previously possible in legacy antenna systems using only two or four antennas.

In spatial multiplexing, several data streams (layers) are transmitted over independent channels that are spatially separated in space. Increasing the number of parallel layers that can be sent at the same time increases the amount of data that can be passed over the air.

Beamforming is a technique where a weighted coherent phase shift is added to each base station antenna element with the effect of creating a narrow, concentrated beam of energy from the base station antenna array towards the direction of a User Equipment (UE) to which the base station is going to transmit data.

A Minimum Mean Square Estimator (MMSE) criteria is commonly used for computation of the beam weights needed for spatial multiplexing and beamforming. The MMSE criteria results in beam weights according to the equation: $W=H^H(HH^H+\sigma^2 I)^{-1}$. The variable W is the beamforming weight matrix. It has size A×L, where A is the number of base station antennas and L is the number of transmission layers. The variable H is the channel matrix of size P×A, where P is the number of antenna ports in the UE. Thus, each element in H consists of one antenna and one user-layer. Thus, the channel matrix H is built up of stacked row vectors, one row vector for each layer. Each row vector holds the channel estimate samples for each base station antenna. There is one channel matrix for each subcarrier or group of subcarriers, thus there will be one corresponding beam weight computation for each subcarrier or group of subcarriers. The variable $\sigma^2$ is an estimate of the noise energy in the channel estimates and has the purpose to balance the amount of zero forcing and conjugate beamforming in the MMSE.

The channel matrix H is measured by a UE first transmitting a reference signal, i.e., Sounding Reference Signal (SRS), from each one of its transmitter antennas. The base station (i.e., the next generation Node B (gNB) in the case of 3GPP New Radio (NR)) then uses this reference signal to measure the estimated channel on each of its receiver antennas. This creates a picture of the channel properties between the UE and base station antennas, which is captured in the channel matrix H. Each SRS signal is typically transmitted from one transmit antenna in the UE at a time. A precoder may also be applied to the SRS with the effect of the SRS being distributed over several transmit antennas of the UE.

When transmitting with a rank that is below the available number of antennas in the UE, some mapping between SRS ports and transmission layers is required. One might believe that all the channel estimates from all the available SRS ports are always used in the MMSE calculation of the beam weight matrix W. There are, however, several problems with such an approach. The major issue is that this will make the MMSE computation unnecessary complex as the computational complexity of the beam weight computations increases by $L^3$, where L is the number of transmission layers. As an example, to use four SRS ports to calculate a single layer with the MMSE would require ~64 times the complexity compared to the calculation of a single layer. Also, when additional ports are introduced, the zero-forcing part of the MMSE will attempt to restrict the inter-layer interference between the SRS ports, as each SRS port is interpreted as being one transmission layer. As we only have a single layer and no inter-layer interference in reality exists, one can understand that the zero forcing part is unnecessary and that it will reduce the performance of the beamforming.

SUMMARY

Systems and methods for port selection for a Multiple Input Multiple Output (MIMO) transmission in a wireless communication system are disclosed. In embodiment, a method performed by a radio access network (RAN) node for mapping Sounding Reference Signal (SRS) ports to transmission layers comprises obtaining a channel matrix, H, for one subcarrier or a group of subcarriers for a particular User Equipment (UE) and transforming the channel matrix, H, using a Singular Value Decomposition (SVD) of the channel matrix, H, to thereby provide a transformed channel matrix, $\hat{H}=V$. The SVD of the channel matrix, H, is given by $H=USV^H$, where: matrix U is orthogonal and of size P×P where P is the number of SRS ports that are available, matrix V is orthogonal and of size A×A where A is the number of antennas in RAN node, matrix S is of size P×A and holds zero entries except on its main diagonal which is occupied by singular values of the SVD, and the m:th column vector in the matrix V relates to the singular value found at element S(m,m) of the matrix S such that the column vectors in the matrix V are arranged in descending order of SRS port quality. The method further comprises computing (204) beamforming weights using the transformed channel matrix, $\hat{H}=V$. In this manner, the SRS port selection acts on channel estimates rather than on beam weights. As the channel estimation (in downlink) comes earlier than the beamforming weight computations, this means that the SRS port selection can be calculated offline as a pre-step before the beamforming weight computations are made.

In one embodiment, computing beamforming weights using the transformed channel matrix, $\hat{H}=V$, comprises selecting one or more best ports, according to the singular values, for mapping to one transmission layer each up to a number of transmission layers supported by a current transmission rank of the particular UE.

In one embodiment, computing beamforming weights using the transformed channel matrix, $\hat{H}=V$, comprises selecting the first L columns of the transformed channel matrix, $\hat{H}=V$, for mapping to L transmission layers, respectively, wherein L is the number of transmission layers supported by a current transmission rank of the particular UE.

In one embodiment, transforming the channel matrix, H, using SVD of the channel matrix, H, to thereby provide the transformed channel matrix, $\hat{H}$=V, comprises deriving the matrix V for the SVD of the channel matrix, H. In one embodiment, deriving the matrix V for the SVD of the channel matrix, H, comprises computing the matrix U of the SVD as a solution to an eigen problem [U, D]=eig(channel covariance matrix), where the matrix U is a matrix with eigen vectors stacked on the columns in U and matrix D is a diagonal matrix that holds the eigen values corresponding to each eigen vector, and computing the matrix V based on the matrix U and the matrix D provided by the solution to the eigen problem. In one embodiment, the channel covariance matrix is a per subcarrier or per subcarrier group channel covariance matrix $HH^H$. In another embodiment, the channel covariance matrix is a wideband channel covariance matrix computed by summing channel covariance matrices over all subcarriers or by summing channel covariance matrices over groups of subcarriers.

Corresponding embodiments of a RAN node are also disclosed. In one embodiment, a RAN node for mapping SRS ports to transmission layers is adapted to obtain a channel matrix, H, for one subcarrier or a group of subcarriers for a particular UE, transform the channel matrix, H, using a SVD of the channel matrix, H, to thereby provide a transformed channel matrix, $\hat{H}$=V. The SVD of the channel matrix, H, is given by $H=USV^H$, where: matrix U is orthogonal and of size P×P where P is the number of SRS ports that are available, matrix V is orthogonal and of size A×A where A is the number of antennas in RAN node, matrix S is of size P×A and holds zero entries except on its main diagonal which is occupied by singular values of the SVD, and the m:th column vector in the matrix V relates to the singular value found at element S(m,m) of the matrix S such that the column vectors in the matrix V are arranged in descending order of SRS port quality. The RAN node is further adapted to compute beamforming weights using the transformed channel matrix, $\hat{H}$=V.

In another embodiment, a RAN node for mapping SRS ports to transmission layers comprise processing circuitry configure to cause the RAN node to obtain a channel matrix, H, for one subcarrier or a group of subcarriers for a particular UE, transform the channel matrix, H, using a SVD of the channel matrix, H, to thereby provide a transformed channel matrix, $\hat{H}$=V. The SVD of the channel matrix, H, is given by $H=USV^H$, where: matrix U is orthogonal and of size P×P where P is the number of SRS ports that are available, matrix V is orthogonal and of size A×A where A is the number of antennas in RAN node, matrix S is of size P×A and holds zero entries except on its main diagonal which is occupied by singular values of the SVD, and the m:th column vector in the matrix V relates to the singular value found at element S(m,m) of the matrix S such that the column vectors in the matrix V are arranged in descending order of SRS port quality. The processing circuitry is further configured to cause the RAN node to compute beamforming weights using the transformed channel matrix, $\hat{H}$=V.

In another embodiment, a method performed by a RAN node for mapping SRS ports to transmission layers comprises transforming a channel matrix, H, for a particular UE to thereby provide a transformed channel matrix, $\hat{H}$, in which SRS ports are ordered in order of importance, according to singular values of an eigen decomposition derived using either a wideband channel covariance matrix or a subband channel covariance matrix as an input. The method further comprises computing beamforming weights using the transformed channel matrix, $\hat{H}$=V, wherein computing the beamforming weights comprises selecting one or more best SRS ports, according to the singular values, for mapping to one transmission layer each up to a number of transmission layers supported by a current transmission rank of the particular UE.

In one embodiment, transforming the channel matrix, H, to thereby provide the transformed channel matrix, $\hat{H}$, comprises transforming (202) the channel matrix, H, using a SVD of the channel matrix, H, to thereby provide a transformed channel matrix, $\hat{H}$=V. The SVD of the channel matrix, H, is given by $H=USV^H$, where: matrix U is orthogonal and of size P×P where P is the number of SRS ports that are available, matrix V is orthogonal and of size A×A where A is the number of antennas in RAN node, matrix S is of size P×A and holds zero entries except on its main diagonal which is occupied by singular values of the SVD, and the m:th column vector in the matrix V relates to the singular value found at element S(m,m) of the matrix S such that the column vectors in the matrix V are arranged in descending order of SRS port quality. In one embodiment, computing the beamforming weights using the transformed channel matrix, $\hat{H}$=V, comprises selecting the first L columns of the transformed channel matrix, $\hat{H}$=V, for mapping to L transmission layers, respectively, wherein L is the number of transmission layers supported by a current transmission rank of the particular UE.

In one embodiment, transforming the channel matrix, H, using SVD of the channel matrix, H, to thereby provide the transformed channel matrix, $\hat{H}$=V, comprises deriving the matrix V for the SVD of the channel matrix, H. In one embodiment, deriving the matrix V for the SVD of the channel matrix, H, comprises computing the matrix U of the SVD as a solution to an eigen problem [U,D]=eig(channel covariance matrix), where the matrix U is a matrix with eigen vectors stacked on the columns in U and matrix D is a diagonal matrix that holds the eigen values corresponding to each eigen vector, and computing the matrix V based on the matrix U and the matrix D provided by the solution to the eigen problem. In one embodiment, the channel covariance matrix is a per subcarrier or per subcarrier group channel covariance matrix $HH^H$. In another embodiment, the channel covariance matrix is a wideband channel covariance matrix computed by summing channel covariance matrices over all subcarriers or by summing channel covariance matrices over groups of subcarriers.

Corresponding embodiments of a RAN node are also disclosed. In one embodiment, a RAN node for mapping SRS ports to transmission layers is adapted to transform a channel matrix, H, for a particular UE to thereby provide a transformed channel matrix, $\hat{H}$, in which SRS ports are ordered in order of importance, according to singular values of an eigen decomposition derived using either a wideband channel covariance matrix or a subband channel covariance matrix as an input. The RAN node is further adapted to compute beamforming weights using the transformed channel matrix, $\hat{H}$=V, wherein computing (204) the beamforming weights comprises selecting (204A) one or more best SRS ports, according to the singular values, for mapping to one transmission layer each up to a number of transmission layers supported by a current transmission rank of the particular UE.

In another embodiment, a RAN node for mapping SRS ports to transmission layers comprises processing circuitry configured to cause the RAN node to transform a channel matrix, H, for a particular UE to thereby provide a transformed channel matrix, $\hat{H}$, in which SRS ports are ordered in order of importance, according to singular values of an eigen decomposition derived using either a wideband channel covariance matrix or a subband channel covariance matrix as an input. The processing circuitry is further configured to cause the RAN node to compute beamforming weights using the transformed channel matrix, $\hat{H}=V$, wherein computing (204) the beamforming weights comprises selecting (204A) one or more best SRS ports, according to the singular values, for mapping to one transmission layer each up to a number of transmission layers supported by a current transmission rank of the particular UE.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
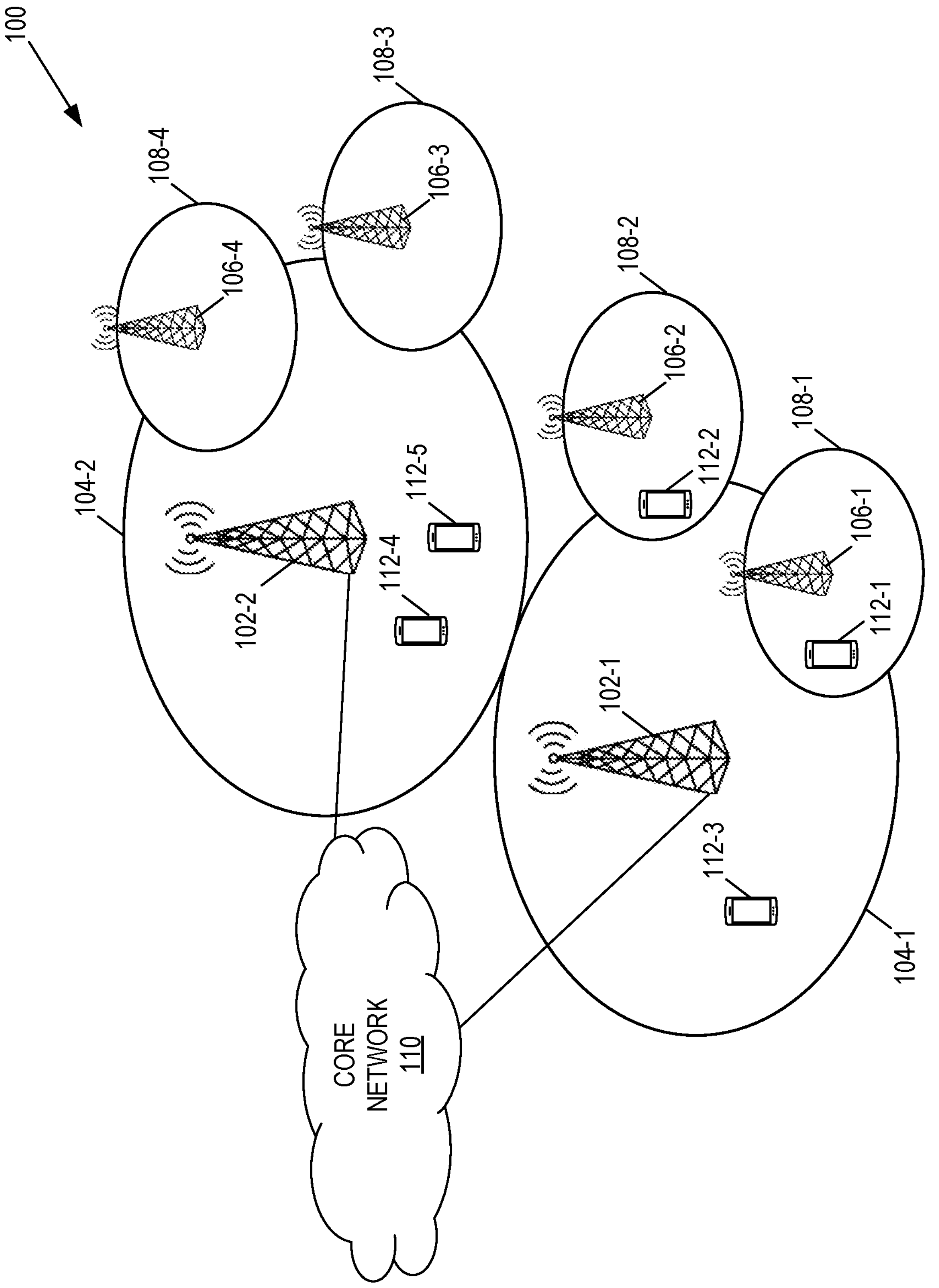
FIG. 1 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" or "RAN node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). As discussed above, when transmitting with a rank that is below the available number of antennas in the UE, some mapping between Sounding Reference Signal (SRS) ports and transmission layers is required. There are many ways for mapping SRS ports to transmission layers. One approach is to measure the received power from each SRS port in the base station and then sort the SRS ports in order of descending power. With this solution, the strongest SRS port will be used for single layer transmissions, while the two strongest SRS ports are used for dual layer transmissions, and so on. Another aspect to consider is how correlated the SRS signals on the SRS ports are. If the two strongest SRS ports are highly correlated spatially, they may still not be a good pair from the dual-layer transmission perspective as there is a risk that the channel properties on these ports degenerates to a rank 1 channel that can only support a single transmission layer. Another limitation with the described method is that it maps one SRS port, e.g. UE antenna, to one transmission layer. What this means is that the beam weight computation only uses information from one of all the available SRS ports/UE antennas in the beam weight computation. Thus, information is lost.

Certain aspects of the present disclosure and their embodiments may provide solutions to the aforementioned or other challenges. Systems and methods are disclosed herein for providing a computationally efficient and robust way of projecting the channel estimates into a new domain where the SRS ports are ordered in their order of importance, according to the singular values of the eigen decomposition used for deriving the projection matrices. The eigen decomposition can be derived by either using a wideband channel covariance matrix or a subband channel covariance matrix, e.g. per subcarrier or per group of subcarriers, as the input. The projection step is followed by a selection step per UE. In the selection step, the best ranked SRS ports, according to the singular values, are mapped to one transmission layer each up to the number of layers supported by the current UE transmission rank. The SRS port sorting and selection procedure can be used together with any Single User Multiple Input Multiple Output (SU-MIMO) or Multi-User Multiple Input Multiple Output (MU-MIMO) beamforming weight computation that relies on channel estimates as its input. Thus, the SRS port sorting procedure described herein is not a beamforming algorithm as it does not explicitly produce beam weights.

There are, proposed herein, various embodiments which address one or more of the issues disclosed herein. In one embodiment, a method performed by a radio access network (RAN) node for mapping SRS ports to transmission layers comprises obtaining a channel matrix, H, for one subcarrier or a group of subcarriers for a particular UE and transforming the channel matrix, H, using a Singular Value Decomposition (SVD) of the channel matrix, H, to thereby provide a transformed channel matrix, $\hat{H}=V$. The SVD of the channel matrix, H, is given by $H=USV^H$. Matrix U is orthogonal and of size P×P, where P is the number of SRS ports that are available. Matrix V is orthogonal and of size A×A, where A is the number of antennas in the RAN node. Matrix S is of size P×A and holds zero entries except on its main diagonal which is occupied by singular values of the SVD. The moth column vector in the matrix V relates to the singular value found at element S(m,m) of the matrix S such that the column vectors in the matrix V are arranged in descending order of SRS port quality. The method further comprises computing beamforming weights using the transformed channel matrix, $\hat{H}=V$.

In another embodiment, a method performed by a RAN node for mapping SRS ports to transmission layers comprises transforming a channel matrix, H, for a particular UE to thereby provide a transformed channel matrix, $\hat{H}$, in which SRS ports are ordered in order of importance, according to singular values of an eigen decomposition derived using either a wideband channel covariance matrix or a subband channel covariance matrix as an input. The method further comprises computing beamforming weights using the transformed channel matrix, $\hat{H}=V$, wherein computing the beamforming weights comprises selecting one or more best SRS ports, according to the singular values, for mapping to one transmission layer each up to a number of transmission layers supported by a current transmission rank of the particular UE.

Corresponding embodiments of a RAN node are also disclosed.

Certain embodiments may provide one or more of the following technical advantage(s). There main benefits of embodiments of the disclosed SRS port selection procedure are:

- The SRS port selection acts on channel estimates rather than on beam weights. As the channel estimation (in downlink) comes earlier than the beamforming weight computations, this means that the SRS port selection can be calculated offline as a pre-step before the beamforming weight computations are made.
- The port selection procedure is compatible with any beamforming weight computation method for SU-MIMO and MU MIMO that relies on channel estimates as its input.
- As the SRS port selection procedure is based on the use of a Singular Value Decomposition (SVD), it is numerically stable.
- Because of the matrix symmetries inherent in the disclosed SRS port selection procedure, the calculation of the singular vectors and singular values can be formulated as an eigenvalue problem, which is a simpler problem to solve than the SVD problem.
- The eigen value problem can either be calculated using one single wideband frequency average or by using one eigen value problem per subcarrier resolution, or groups of subcarriers.
- A projection method is used, where a larger singular value problem is solved by first solving a smaller (simpler) eigen value problem. The eigenvectors are then projected to the channel matrix to generate the solution of the full singular value problem.
- During the projection phase it is possible to use a mixture of frequency granularity, where the smaller eigenvalue problem is solved using a wideband matrix while the projection step is applied to the channel matrix at every subcarrier or group of subcarriers.

The (simpler) eigen vector problem can, if SVD based algorithms are preferred, in turn be translated into a singular value problem of the same complexity.

FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN) and a 5G Core (5GC); however, the present disclosure is not limited thereto. The embodiments described herein may be utilized in any type of wireless network or cellular communication system that utilizes beamforming. In this example, the RAN includes base stations 102-1 and 102-2, which in the 5GS include NR base stations (gNBs) and optionally next generation eNBs (ng-eNBs) (e.g., LTE RAN nodes connected to the 5GC), controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or RRHs, or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5G System (5GS) is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto.

Embodiments of systems and methods for providing a computationally efficient and robust way of projecting channel estimates into a new domain where Sounding Reference Signal (SRS) ports are ordered in their order of importance, according to the singular values of the eigen decomposition used for deriving the projection matrices. The eigen decomposition can be derived by either using a wideband channel covariance matrix or a subband matrix, e.g. per subcarrier or per group of subcarriers, as the input. The projection step is followed by a selection step per UE. In the selection step the best ranked SRS ports, according to the singular values, are mapped to one transmission layer each up to the number of layers supported by the current UE transmission rank. The SRS port sorting and selection procedure can be used together with any Single User Multiple Input Multiple Output (SU-MIMO) or Multi-User Multiple Input Multiple Output (MU-MIMO) beamforming weight computation that relies on channel estimates as its input. Thus, the SRS port sorting procedure described herein is not a beamforming algorithm as it does not explicitly produce beam weights.

More specifically, an SRS port selection procedure is disclosed herein that is based on singular value decomposition of the channel matrix H for one UE. Before describing embodiments of the disclosed SRS port selection procedure, a description of some properties of Singular Value Decomposition (SVD) is beneficial. The channel matrix H for one subcarrier or group of subcarriers for one UE 112 can be decomposed as: $H=USV^H$. This factorization is referred to as an SVD. Matrix U is orthogonal and of size P×P, where P is the number of SRS ports that are available. Matrix V is also orthogonal but of size A×A, where A is the number of antennas in the base station 102. If a matrix X is orthogonal, then the following properties must hold: $XX^H=X^HX=1$. Matrix S is of size P×A and holds zero entries except on its main diagonal which is occupied by the singular values. The m:th row vector in U and the m:th column vector in V relates to the singular value found at element S(m,m). The strongest singular value is found at element S(0,0), and the weakest singular value is found at element S(P−1, P−1). If the channel H is rank deficient, this will be shown in the singular values as the singular values above the deficient rank will be much smaller relative to the dominant singular value at S(0,0). Thus, the singular values reveal important information about the quality of each SRS port, and the output from the SVD will arrange the SRS ports in descending order of quality.

The classical method for providing SVD based beamforming is to define the beamforming weights W as a matrix of size A×L, where L is the number of layers. The SVD beamforming is the transpose and conjugate of first L columns of matrix V, i.e., $W=V(:,1{:}L)^H$, where V(:,1:L) denotes the first L columns of matrix V. When W is applied to the right-hand side of channel matrix H, e.g. we apply beamforming to the channel, the resulting channel observed on the UE antennas is: $HW=HV(:,1{:}L)^H=US(1{:}P,\ 1{:}L)$, where S(1:P, 1:L) denotes the first P rows and first L columns of matrix S. The projection of V(:,1:L) on the channel matrix H will generate the matrix US(1:P, 1:L). Matrix US(1:P, 1:L) is the channel that we want the UE receiver to measure on its receiver antennas. Since US(1:P, 1:L) is also an orthogonal matrix, this will allow the UE to separate the received transmission layers via the use of a MMSE or some other receiver structure.

In accordance with embodiments of the present disclosure, the SVD is used to transform the channel matrix H. More specifically, instead of explicitly mapping the singular vectors to beamforming weights via $W=V^H$, as is done in the classical beamforming method described above, an indirect approach is used in the embodiments described herein where the singular vector V is used to transform the channel matrix H into a new channel matrix $\hat{H}=V$. One of the most basic forms of beamforming is conjugate beamforming, which uses the beamforming weights $W=\hat{H}^H=V^H$. Thus, conjugate beamforming with our new transformed channel estimate $\hat{H}=V$ will produce the same beamforming weights as is used for classical SVD beamforming. This shows that our transformed channel estimates have reasonable properties.

In regard to derivation of the V matrix, the singular value decomposition of the channel matrix H is given by the factorization:

$$H = USV^H.$$

The first step in the computation of the U matrix is to create a channel covariance matrix of size P×P according to: $HH^H$. Expressed as an SVD decomposition of $H=USV^H$, this results in:

$$HH^H = USV^H VSU^H = US^2U^H.$$

Next, matrix U is multiplied to the right-hand side of each side of the equal sign. This results in:

$$HH^H U = US^2.$$

Since matrix $S^2$ is a diagonal matrix, the equation $HH^HU=US^2$ has the form of an eigen value problem. The solution to the eigen value problem is:

$$[U, D] = eig(HH^H),$$

where U is a matrix with eigen vectors stacked on the columns in U. Matrix D is a diagonal matrix that holds the eigen values corresponding to each eigen vector. The singular value matrix S is derived from D via, $S=\sqrt{D}$. Matrix V can now be calculated via the relationship: $H=USV^H$, thus, $SV^H=U^HH$, or alternatively:

$$V^H = S^{-1}U^H H.$$

The additional benefit of using $S^{-1}U^H$ rather than $U^H$ in the calculation of V is that the inclusion of $S^{-1}$ will balance the power between the transmission layers so that they are transmitted with equal power for each layer if no other additional power allocation schemes are applied.

The calculation of matrix $HH^H$ and the corresponding U, V, and S matrices of the SVD decomposition in the derivation of the V matrix above was thought of being calculated per subcarrier or per group of subcarriers. However, it is also possible to make a wideband covariance matrix by summing up the $HH^H$ matrices from each subcarrier or group of subcarriers with the effect of creating a single wideband matrix. The SVD or eigen decomposition of the wideband version of $HH^H$ will produce a wideband matrix $U^H$, and S. Thus, the SRS port selection is performed in a wideband sense. However, in the calculation of the V matrix, e.g. $SV^H=U^HH$ or $V^H=S^{-1}U^HH$, the H part is taken from each subcarrier or group of subcarriers, while matrix U (and S) are wideband matrices. The main benefit of using a wideband based approach for calculating the eigen value decomposition is to have a reduce complexity as only one eigen decomposition is needed per UE instead of having to make one eigen decomposition for every subcarrier or group of subcarriers for each UE.

The transformed version of the channel matrix $\hat{H}=V$ can now be directly used in any subsequent beamforming weight computations. As the SVD decomposition in the disclosed method is intended to only transform the layers used within one UE and not between UE's, there will be no orthogonalization between UE layers using the disclosed method. Thus, for MU-MIMO transmissions, the orthogonalization of the transmission layers between UE's would have to be accomplished with a complementary method that will provide orthogonalization of the inter-UE layer interference. One example of a method to accomplish this orthogonalization is MMSE beamforming. For a MU-MIMO computation, the best SRS ports in $\hat{H}$ are picked from each UE when creating the combined channel matrix $\tilde{H}$ that holds the SRS ports from all the co-scheduled UE's. Matrix $\tilde{H}$ is then used as input to the MU-MIMO weight computation, for example via the MMSE:

$$W = \tilde{H}^H\left(\tilde{H}\tilde{H}^H + \sigma^2 I\right)^{-1}.$$

Figure 2:
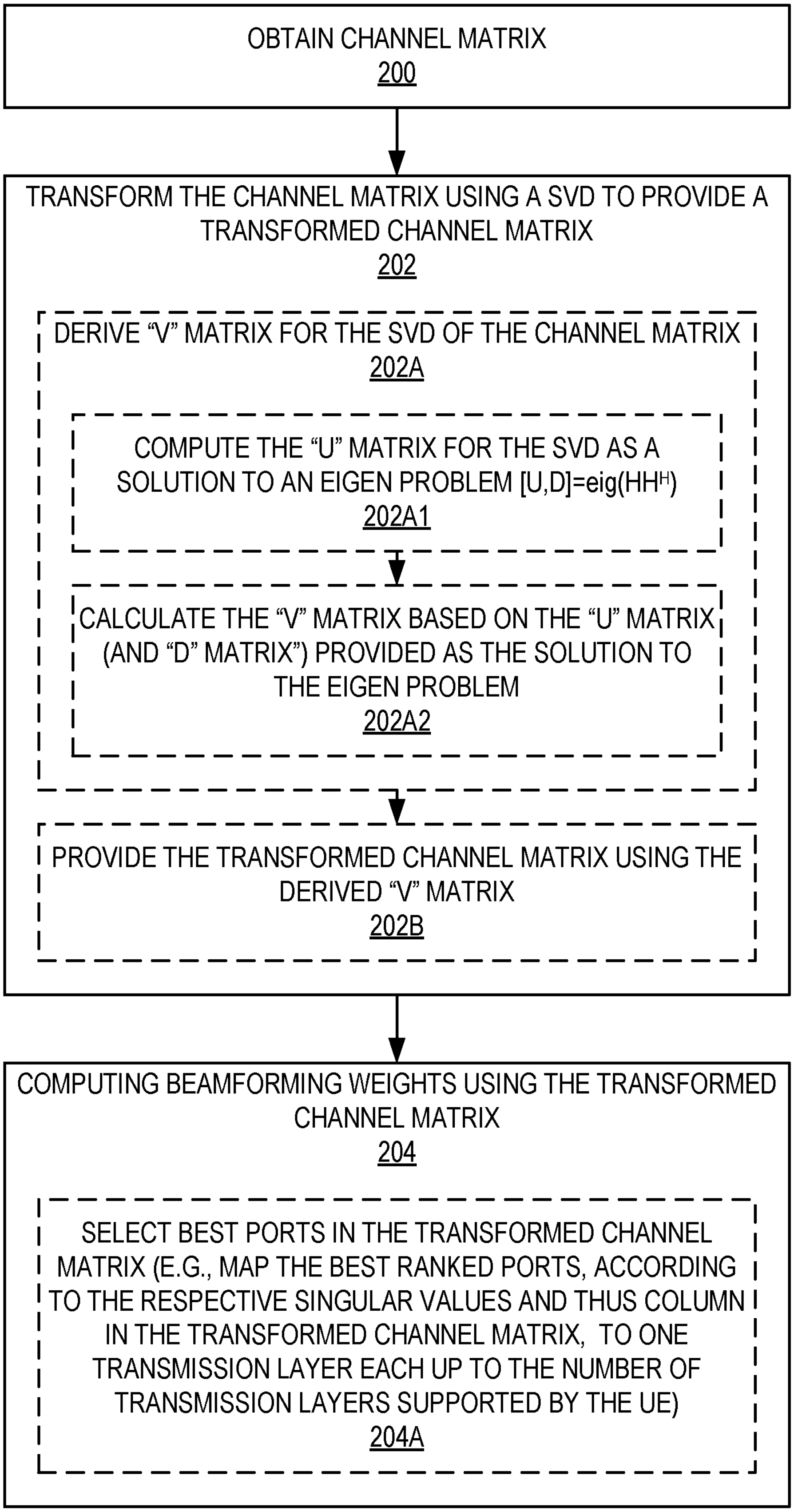
FIG. 2 illustrates the operation of a Radio Access Network (RAN) node to perform Sounding Reference Signal (SRS) port mapping in accordance with one embodiment of the present disclosure.

FIG. 2 illustrates the operation of a RAN node (e.g., a base station 102 such as, e.g., a gNB or a network node that performs some of the functionality of the base station 102 such as, e.g., a gNB-DU) to perform SRS port mapping in accordance with one embodiment of the present disclosure. As illustrated, the RAN node obtains a channel matrix H for one subcarrier or group of subcarriers for one UE 112 (step 200). The RAN node transforms the channel matrix H using a SVD to provide a transformed channel matrix $\hat{H}=V$ (step 202). More specifically, in one embodiment, the RAN node derives the V matrix for the SVD of the channel matrix H (step 202A). As discussed above, in one embodiment, the RAN node derives the V matrix by first computing the U matrix as solution to an eigen value problem $[U,D]=eig(HH^H)$ (step 202A1) and then calculating the V matrix via the relationship: $H=USV^H$, thus, $SV^H=U^HH$, or alternatively $V^H=S^{-1}U^HH$. The RAN node then uses the derived V matrix to provide the transformed channel matrix $\hat{H}=V$ (step 202B). Importantly, by utilizing the V matrix as the transformed channel matrix $\hat{H}$, the m:th column vector in transformed channel matrix $\hat{H}$ (i.e., the m:th column vector in the V matrix) relates to the singular value found at element S(m, m), which corresponds the m:th strongest singular value). In this manner, the columns of the transformed channel matrix $\hat{H}=V$ are arranged in descending order of SRS port quality. The RAN node then computes beamforming weights using the transformed channel matrix $\hat{H}=V$ (step 204). For this computation, the best ports in the transformed channel matrix $\hat{H}=V$ are selected, e.g., when creating a combined channel matrix $\tilde{H}$ that holds the SRS ports from all the co-scheduled UE's (step 204A). In other words, the best ranked SRS ports, according to the singular values, are mapped to one transmission layer each up to the number of layers supported by the current UE transmission rank.

Again, as described above, while in one embodiment the derivation of the V matrix in step 202A (i.e., the calculation of the channel covariance matrix $HH^H$ and the corresponding U, V, and S matrices of the SVD decomposition in the derivation of the V matrix) is done per subcarrier or per group of subcarriers, the derivation of the V matrix in step 202A (i.e., the calculation of the channel covariance matrix $HH^H$ and the corresponding U, V, and S matrices of the SVD decomposition in the derivation of the V matrix) may alternatively be done in a wideband manner, as described above.

Figure 3:
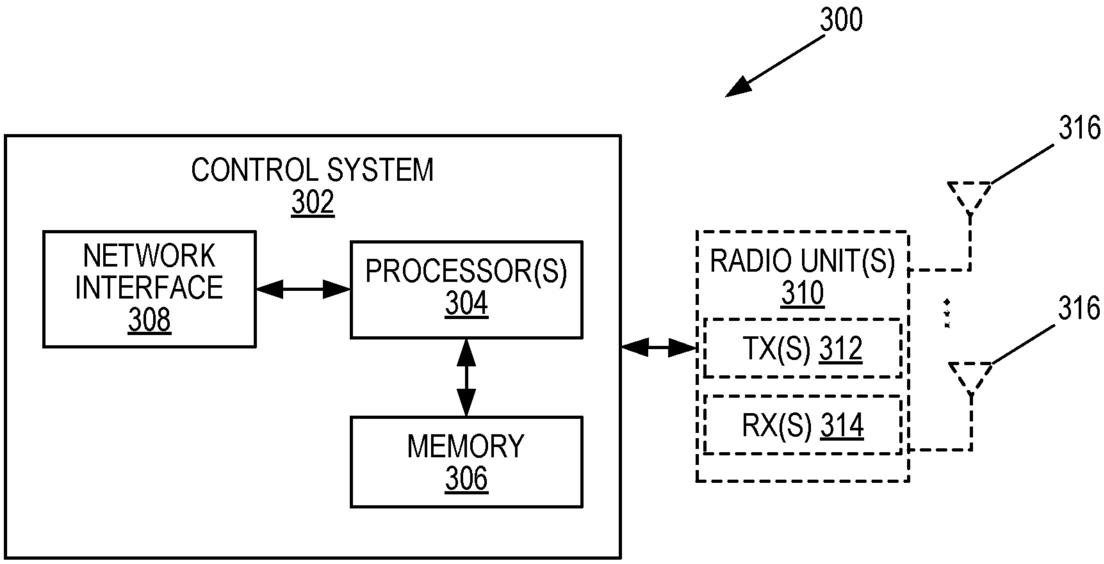
FIGS. 3, 4, and 5 are schematic block diagrams of example embodiments of a RAN node.

FIG. 3 is a schematic block diagram of a RAN node 300 according to some embodiments of the present disclosure. Optional features are represented by dashed boxes. The RAN node 300 may be, for example, a base station 102 or 106 or a network node that implements all or part of the functionality of the base station 102 or gNB described herein. As illustrated, the RAN node 300 includes a control system 302 that includes one or more processors 304 (e.g., Central Processing Units (CPUs), Application Specific Integrated Circuits (ASICs), Field Programmable Gate Arrays (FPGAs), and/or the like), memory 306, and a network interface 308. The one or more processors 304 are also referred to herein as processing circuitry. In addition, the RAN node 300 may include one or more radio units 310 that each includes one or more transmitters 312 and one or more receivers 314 coupled to one or more antennas 316. The radio units 310 may be referred to or be part of radio interface circuitry. In some embodiments, the radio unit(s) 310 is external to the control system 302 and connected to the control system 302 via, e.g., a wired connection (e.g., an optical cable). However, in some other embodiments, the radio unit(s) 310 and potentially the antenna(s) 316 are integrated together with the control system 302. The one or more processors 304 operate to provide one or more functions of the RAN node 300 as described herein (e.g., one or more functions of the base station 102, gNB, or RAN node described above, e.g., with respect to FIG. 2). In some embodiments, the function(s) are implemented in software that is stored, e.g., in the memory 306 and executed by the one or more processors 304.

Figure 4:
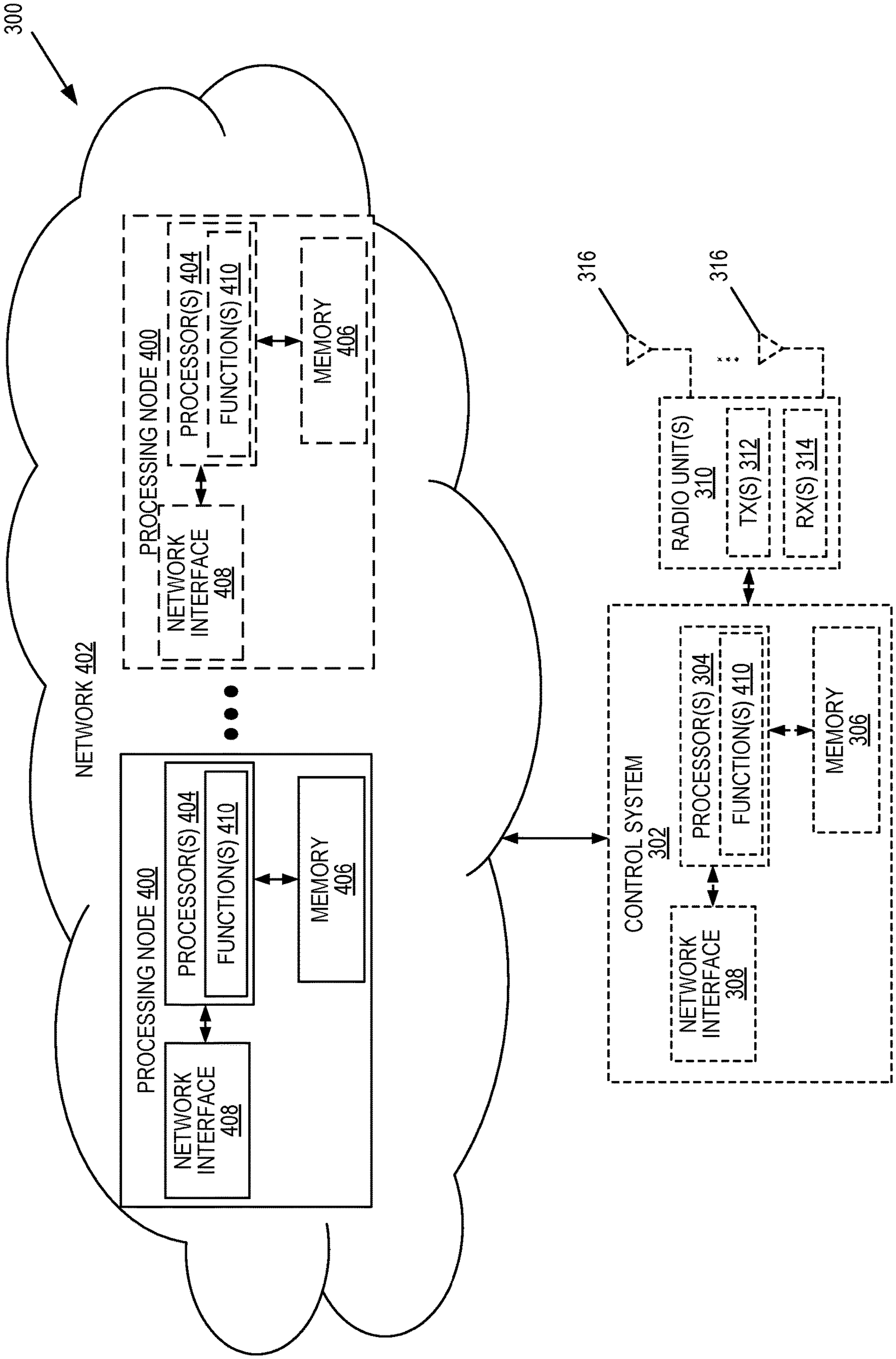

FIG. 4 is a schematic block diagram that illustrates a virtualized embodiment of the RAN node 300 according to some embodiments of the present disclosure. Again, optional features are represented by dashed boxes. As used herein, a "virtualized" RAN is an implementation of the RAN node 300 in which at least a portion of the functionality of the RAN node 300 is implemented as a virtual component(s) (e.g., via a virtual machine(s) executing on a physical processing node(s) in a network(s)). As illustrated, in this example, the RAN node 300 may include the control system 302 and/or the one or more radio units 310, as described above. The control system 302 may be connected to the radio unit(s) 310 via, for example, an optical cable or the like. The RAN node 300 includes one or more processing nodes 400 coupled to or included as part of a network(s) 402. If present, the control system 302 or the radio unit(s) are connected to the processing node(s) 400 via the network 402. Each processing node 400 includes one or more processors 404 (e.g., CPUs, ASICS, FPGAs, and/or the like), memory 406, and a network interface 408.

In this example, functions 410 of the RAN node 300 described herein (e.g., one or more functions of the base station 102, gNB, or RAN node described above, e.g., with respect to FIG. 2) are implemented at the one or more processing nodes 400 or distributed across the one or more processing nodes 400 and the control system 302 and/or the radio unit(s) 310 in any desired manner. In some particular embodiments, some or all of the functions 410 of the RAN node 300 described herein are implemented as virtual components executed by one or more virtual machines implemented in a virtual environment(s) hosted by the processing node(s) 400. As will be appreciated by one of ordinary skill in the art, additional signaling or communication between the processing node(s) 400 and the control system 302 is used in order to carry out at least some of the desired functions 410. Notably, in some embodiments, the control system 302 may not be included, in which case the radio unit(s) 310 communicate directly with the processing node(s) 400 via an appropriate network interface(s).

In some embodiments, a computer program including instructions which, when executed by at least one processor, causes the at least one processor to carry out the functionality of RAN node 300 or a node (e.g., a processing node 400) implementing one or more of the functions 410 of the RAN node 300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 5:
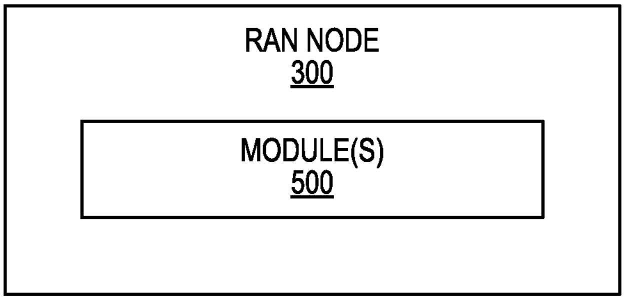

FIG. 5 is a schematic block diagram of the RAN node 300 according to some other embodiments of the present disclosure. The RAN node 300 includes one or more modules 500, each of which is implemented in software. The module(s) 500 provide the functionality of the RAN node 300 described herein (e.g., one or more functions of the base station 102, gNB, or RAN node described above, e.g., with respect to FIG. 2). This discussion is equally applicable to the processing node 400 of FIG. 4 where the modules 500 may be implemented at one of the processing nodes 400 or distributed across multiple processing nodes 400 and/or distributed across the processing node(s) 400 and the control system 302.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed by a radio access network, RAN, node for mapping Sounding Reference Signal, SRS, ports to transmission layers, the method comprising:

obtaining (200) a channel matrix, H, for one subcarrier or a group of subcarriers for a particular User Equipment, UE, (112);

transforming (202) the channel matrix, H, using a Singular Value Decomposition, SVD, of the channel matrix, H, to thereby provide a transformed channel matrix, $\hat{H}=V$, wherein:

the SVD of the channel matrix, H, is given by $H=USV^H$, where:

matrix U is orthogonal and of size P×P, where P is the number of SRS ports that are available;

matrix V is orthogonal and of size A×A, where A is the number of antennas in RAN node;

matrix S is of size P×A and holds zero entries except on its main diagonal which is occupied by singular values of the SVD; and the m:th column vector in the matrix V relates to the singular value found at element S(m,m) of the matrix S such that the column vectors in the matrix V are arranged in descending order of SRS port quality;

computing (204) beamforming weights using the transformed channel matrix, $\hat{H}$=V.

Embodiment 2: The method of embodiment 1 wherein computing beamforming weights using the transformed channel matrix, $\hat{H}$=V, comprises selecting (204A) one or more best ports, according to the singular values, for mapping to one transmission layer each up to a number of transmission layers supported by a current transmission rank of the particular UE (112).

Embodiment 3: The method of embodiment 1 wherein computing beamforming weights using the transformed channel matrix, $\hat{H}$=V, comprises selecting (204A) the first L columns of the transformed channel matrix, $\hat{H}$=V, for mapping to L transmission layers, respectively, wherein L is the number of transmission layers supported by a current transmission rank of the particular UE (112).

Embodiment 4: The method of any of embodiments 1 to 3 wherein transforming (202) the channel matrix, H, using SVD of the channel matrix, H, to thereby provide the transformed channel matrix, $\hat{H}$=V, comprises deriving (202A) the matrix V for the SVD of the channel matrix, H.

Embodiment 5: The method of embodiment 4 wherein deriving (202A) the matrix V for the SVD of the channel matrix, H, comprises:

computing (202A1) the matrix U of the SVD as a solution to an eigen problem [U,D]=eig(channel covariance matrix), where the matrix U is a matrix with eigen vectors stacked on the columns in U and matrix D is a diagonal matrix that holds the eigen values corresponding to each eigen vector; and computing (202A2) the matrix V based on the matrix U and the matrix D provided by the solution to the eigen problem (e.g., via the relationship: $H=USV^H$, thus, $SV^H=U^HH$, or alternatively: $V^H=S^{-1}U^HH$.

Embodiment 6: The method of embodiment 5 wherein the channel covariance matrix is a per subcarrier or per subcarrier group channel covariance matrix $HH^H$.

Embodiment 7: The method of embodiment 5 wherein the channel covariance matrix is a wideband channel covariance matrix computed by summing channel covariance matrices over all subcarriers or by summing channel covariance matrices over groups of subcarriers.

Embodiment 8: A RAN node (300) adapted to perform the method of any of embodiments 1 to 7.

Embodiment 9: A RAN node (300) comprising processing circuitry (304; 404) configured to cause the RAN node (300) to perform the method of any of embodiments 1 to 7.

Embodiment 10: A method performed by a radio access network, RAN, node for mapping Sounding Reference Signal, SRS, ports to transmission layers, the method comprising:

transforming (202) a channel matrix, H, for a particular User Equipment, UE, (112) to thereby provide a transformed channel matrix, $\hat{H}$, in which SRS ports are ordered in order of importance, according to singular values of an eigen decomposition derived using either a wideband channel covariance matrix or a subband channel covariance matrix as an input; and computing (204) beamforming weights using the transformed channel matrix, $\hat{H}$=V, wherein computing (204) the beamforming weights comprises selecting (204A) one or more best SRS ports, according to the singular values, for mapping to one transmission layer each up to a number of transmission layers supported by a current transmission rank of the particular UE (112).

Embodiment 11: The method of embodiment 10 wherein transforming (202) the channel matrix, H, to thereby provide the transformed channel matrix, $\hat{H}$, comprises:

transforming (202) the channel matrix, H, using a Singular Value Decomposition, SVD, of the channel matrix, H, to thereby provide a transformed channel matrix, $\hat{H}$=V, wherein:

the SVD of the channel matrix, H, is given by $H=USV^H$, where:

matrix U is orthogonal and of size P×P, where P is the number of SRS ports that are available;

matrix V is orthogonal and of size A×A, where A is the number of antennas in RAN node;

matrix S is of size P×A and holds zero entries except on its main diagonal which is occupied by singular values of the SVD; and the m:th column vector in the matrix V relates to the singular value found at element S(m,m) of the matrix S such that the column vectors in the matrix V are arranged in descending order of SRS port quality;

Embodiment 12: The method of embodiment 11 wherein computing (204) the beamforming weights using the transformed channel matrix, $\hat{H}$=V, comprises selecting (204A) the first L columns of the transformed channel matrix, $\hat{H}$=V, for mapping to L transmission layers, respectively, wherein L is the number of transmission layers supported by a current transmission rank of the particular UE (112).

Embodiment 13: The method of any of embodiments 11 or 12 wherein transforming (202) the channel matrix, H, using SVD of the channel matrix, H, to thereby provide the transformed channel matrix, $\hat{H}$=V, comprises deriving (202A) the matrix V for the SVD of the channel matrix, H.

Embodiment 14: The method of embodiment 13 wherein deriving (202A) the matrix V for the SVD of the channel matrix, H, comprises:

computing (202A1) the matrix U of the SVD as a solution to an eigen problem [U,D]=eig(channel covariance matrix), where the matrix U is a matrix with eigen vectors stacked on the columns in U and matrix D is a diagonal matrix that holds the eigen values corresponding to each eigen vector; and computing (202A2) the matrix V based on the matrix U and the matrix D provided by the solution to the eigen problem (e.g., via the relationship: $H=USV^H$, thus, $SV^H=U^HH$, or alternatively: $V^H=S^{-1}U^HH$.

Embodiment 15: The method of embodiment 14 wherein the channel covariance matrix is a per subcarrier or per subcarrier group channel covariance matrix $HH^H$.

Embodiment 16: The method of embodiment 14 wherein the channel covariance matrix is a wideband channel covariance matrix computed by summing channel covariance matrices over all subcarriers or by summing channel covariance matrices over groups of subcarriers.

Embodiment 17: A RAN node (300) adapted to perform the method of any of embodiments 10 to 16.

Embodiment 18: A RAN node (300) comprising processing circuitry (304; 404) configured to cause the RAN node (300) to perform the method of any of embodiments 10 to 16.

Those skilled in the art will recognize improvements and modifications to the embodiments of the present disclosure. All such improvements and modifications are considered within the scope of the concepts disclosed herein.

The invention claimed is:

1. A method performed by a radio access network, RAN, node for mapping Sounding Reference Signal, SRS, ports to transmission layers, the method comprising:

receiving at a receiver of the RAN node, SRS from a number P of the SRS ports of a particular User Equipment, UE, via a plurality of antennas of the RAN node;

obtaining a channel matrix, W, for one subcarrier or a group of subcarriers for the particular UE based on measurements performed on the SRS received from the particular UE via the plurality of antennas of the RAN node;

transforming the channel matrix, H, using a Singular Value Decomposition, SVD, of the channel matrix, H, to thereby provide a transformed channel matrix, $\hat{H}$=V, wherein:

the SVD of the channel matrix, H, is given by $H=USV^H$, where:

matrix U is orthogonal and of size P×P, where P is the number of SRS ports that are available;

matrix V is orthogonal and of size A×A, where A is the number of antennas in RAN node;

matrix S is of size P×A and holds zero entries except on its main diagonal which is occupied by singular values of the SVD; and the m:th column vector in the matrix V relates to the singular value found at element S(m,m) of the matrix S such that the column vectors in the matrix V are arranged in descending order of SRS port quality;

computing beamforming weights using the transformed channel matrix, $\hat{H}$=V.

2. The method of claim 1 wherein computing beamforming weights using the transformed channel matrix, $\hat{H}$=V, comprises selecting one or more best ports, according to the singular values, for mapping to one transmission layer each up to a number of transmission layers supported by a current transmission rank of the particular UE.

3. The method of claim 1 wherein computing beamforming weights using the transformed channel matrix, $\hat{H}$=V, comprises selecting the first L columns of the transformed channel matrix, $\hat{H}$=V, for mapping to L transmission layers, respectively, wherein L is the number of transmission layers supported by a current transmission rank of the particular UE.

4. The method of claim 1 wherein transforming the channel matrix, H, using SVD of the channel matrix, H, to thereby provide the transformed channel matrix, $\hat{H}$=V, comprises deriving the matrix V for the SVD of the channel matrix, H.

5. The method of claim 4 wherein deriving the matrix V for the SVD of the channel matrix, H, comprises:

computing the matrix U of the SVD as a solution to an eigen problem |U,D|=eig(channel covariance matrix), where the matrix U is a matrix with eigen vectors stacked on the columns in U and matrix D is a diagonal matrix that holds the eigen values corresponding to each eigen vector; and computing the matrix V based on the matrix U and the matrix D provided by the solution to the eigen problem.

6. The method of claim 5 wherein the channel covariance matrix is a per subcarrier or per subcarrier group channel covariance matrix $HH^H$.

7. The method of claim 5 wherein the channel covariance matrix is a wideband channel covariance matrix computed by summing channel covariance matrices over all subcarriers or by summing channel covariance matrices over groups of subcarriers.

8. A Radio Access Network, RAN, node for mapping Sounding Reference Signal, SRS, ports to transmission layers, the RAN node adapted to:

receive at a receiver of the RAN node, SRS from a number P of the SRS ports of a particular User Equipment, UE, via a plurality of antennas of the RAN node;

obtain a channel matrix, H, for one subcarrier or a group of subcarriers for the particular UE based on measurements performed on the SRS received from the particular UE via the plurality of antennas of the RAN node;

transform the channel matrix, H, using a Singular Value Decomposition, SVD, of the channel matrix, H, to thereby provide a transformed channel matrix, $\hat{H}$=V, wherein:

the SVD of the channel matrix, H, is given by $H=USV^H$, where:

matrix U is orthogonal and of size P×P, where P is the number of SRS ports that are available;

matrix V is orthogonal and of size A×A, where A is the number of antennas in RAN node;

matrix S is of size P×A and holds zero entries except on its main diagonal which is occupied by singular values of the SVD; and the m:th column vector in the matrix V relates to the singular value found at element S(m,m) of the matrix S such that the column vectors in the matrix V are arranged in descending order of SRS port quality;

compute beamforming weights using the transformed channel matrix, $\hat{H}$=V.

9. A method performed by a radio access network, RAN, node for mapping Sounding Reference Signal, SRS, ports to transmission layers, the method comprising:

receiving at a receiver of the RAN node, SRS from the SRS ports of a particular User Equipment, UE, via a plurality of antennas of the RAN node;

obtaining a channel matrix, H, for one subcarrier or a group of subcarriers for the particular UE based on measurements performed on the SRS received from the particular UE via the plurality of antennas of the RAN node;

transforming the channel matrix, H, for the particular UE to thereby provide a transformed channel matrix, $\hat{H}$, in which SRS ports are ordered in order of importance, according to singular values of an eigen decomposition derived using either a wideband channel covariance matrix or a subband channel covariance matrix as an input; and computing beamforming weights using the transformed channel matrix, $\hat{H}$=V, wherein computing the beamforming weights comprises selecting one or more best SRS ports, according to the singular values, for mapping to one transmission layer each up to a number of transmission layers supported by a current transmission rank of the particular UE.

10. The method of claim 9 wherein transforming the channel matrix, H, to thereby provide the transformed channel matrix, $\hat{H}$, comprises:

transforming the channel matrix, H, using a Singular Value Decomposition, SVD, of the channel matrix, H, to thereby provide a transformed channel matrix, $\hat{H}$=V, wherein:

the SVD of the channel matrix, H, is given by $H=USV^H$, where:

matrix U is orthogonal and of size P×P, where P is the number of SRS ports that are available;

matrix V is orthogonal and of size A×A, where A is the number of antennas in RAN node;

matrix S is of size P×A and holds zero entries except on its main diagonal which is occupied by singular values of the SVD; and the m:th column vector in the matrix W relates to the singular value found at element S(m,m) of the matrix S such that the column vectors in the matrix V are arranged in descending order of SRS port quality.

11. The method of claim 10 wherein computing the beamforming weights using the transformed channel matrix, $\hat{H}$=V, comprises selecting the first L columns of the transformed channel matrix, $\hat{H}$=V, for mapping to L transmission layers, respectively, wherein L is the number of transmission layers supported by a current transmission rank of the particular UE.

12. The method of claim 10 wherein transforming the channel matrix, H, using SVD of the channel matrix, H, to thereby provide the transformed channel matrix, $\hat{H}$=V, comprises deriving the matrix V for the SVD of the channel matrix, H.

13. The method of claim 12 wherein deriving the matrix V for the SVD of the channel matrix, H, comprises:

computing the matrix U of the SVD as a solution to an eigen problem |U,D|=eig(channel covariance matrix), where the matrix U is a matrix with eigen vectors stacked on the columns in U and matrix D is a diagonal matrix that holds the eigen values corresponding to each eigen vector; and computing the matrix V based on the matrix U and the matrix D provided by the solution to the eigen problem.

14. The method of claim 13 wherein the channel covariance matrix is a per subcarrier or per subcarrier group channel covariance matrix $HH^H$.

15. The method of claim 13 wherein the channel covariance matrix is a wideband channel covariance matrix computed by summing channel covariance matrices over all subcarriers or by summing channel covariance matrices over groups of subcarriers.

16. A RAN node for mapping Sounding Reference Signal, SRS, ports to transmission layers, the RAN node adapted to:

receive at a receiver of the RAN node, SRS from the SRS ports of a particular User Equipment, UE, via a plurality of antennas of the RAN node;

obtain a channel matrix, H, for one subcarrier or a group of subcarriers for the particular UE based on measurements performed on the SRS received from the particular UE via the plurality of antennas of the RAN node;

transform the channel matrix, H, for the particular UE to thereby provide a transformed channel matrix, $\hat{H}$, in which SRS ports are ordered in order of importance, according to singular values of an eigen decomposition derived using either a wideband channel covariance matrix or a subband channel covariance matrix as an input; and compute beamforming weights using the transformed channel matrix, $\hat{H}$=V, wherein computing the beamforming weights comprises selecting one or more best SRS ports, according to the singular values, for mapping to one transmission layer each up to a number of transmission layers supported by a current transmission rank of the particular UE.

* * * * *